United States Patent

Umezawa et al.

[15] 3,681,398

[45] Aug. 1, 1972

[54] 5-ACETAMIDE-6-METHYLTETRAHYDROPYRAN-2-ONE AND METHOD FOR ITS PRODUCTION

[72] Inventors: Hamao Umezawa; Kenji Maeda; Yasuji Suhara, all of Tokyo, Japan

[73] Assignee: Zaidan Hojin Biseibutsu Kagaku Kenkyu Kai, Shinagawa-ku, Tokyo, Japan

[22] Filed: Jan. 27, 1969

[21] Appl. No.: 794,379

[30] Foreign Application Priority Data

Jan. 31, 1968 Japan..............................43/5354
Jan. 31, 1968 Japan..............................43/5355
Jan. 31, 1968 Japan..............................43/5356
Jan. 31, 1968 Japan..............................43/5357
Jan. 31, 1968 Japan..............................43/5358
Jan. 11, 1969 Japan..............................44/1908
Jan. 11, 1969 Japan..............................44/1909

[52] U.S. Cl.........260/343.5, 260/210 K, 260/210 R, 260/211 R, 260/345.7, 260/345.8, 260/534 R, 260/999

[51] Int. Cl................................................C07d 7/14
[58] Field of Search...................................260/343.5

[56] References Cited

OTHER PUBLICATIONS

Wagner et al. Synthetic Organic Chemistry, John Wiley & Sons, New York, 1953 Sections 323 and 350 relied on.

Primary Examiner—Alex Mazel
Assistant Examiner—Anne Marie T. Tighe
Attorney—Brady, O'Boyle and Gates

[57] ABSTRACT

Process for the synthesis of 5-acetamide-6-methyl-tetrahydropyran-2-ol which is useful as a starting compound for the synthesis of kasugamycin and its homologue by acetylating DL-erythro-4-amino-5-hydroxyhexanoic acid with acetic anhydride and reducing 5-acetamide-6-methyl-tetrahydropyran-2-on with lithium aluminum hydride.

2 Claims, No Drawings

5-ACETAMIDE-6-METHYLTETRAHYDROPYRAN-2-ONE AND METHOD FOR ITS PRODUCTION

The present invention relates to a new chemical compound which is useful as a starting substance for amino sugar, in particular for synthesis of kasugamycin and also to a process for the production of said compound.

An object of the present invention is to provide a process for producing a starting substance for amino sugars, in particular 5-acetamide-6-methyl-tetrahydropyran-2-ol for synthesis of kasugamycin which exhibits inhibition against various kinds of bacteria including Pseudomonas and a strong preventive effect against rice blast.

We, the inventors have attended to the importance of amino sugars including in useful antibiotics such as kasugamycin or antitumor substances and have earnestly studied on the production of a starting substances for amino sugar. As the result of our studies, we have recently succeeded in the synthesis of a new compound 5-acetamide-6-methyltetrahydropyran-2-ol which is useful as a starting compound for the synthesis of kasugamycin and its homologue.

According to the present invention, it is provided a process which comprises reacting DL-erythro-4-amino-5-hydroxyhexanoic acid (IV) with acetic anhydride and reducing 5-acetamide-6-methyl-tetrahydropyran-2-on (V) thus formed with lithium aluminum hydride to give 5-acetamide-6-methyl-tetrahydropyran-2-ol (VI).

DL-erythro-4-amino-5-hydroxyhexanoic acid used in the present invention may be first prepared, for example, by reacting 6-methyl-3,4-dihydropyran-2-on (I) with nitrosyl chloride in organic solvent such as methylene chloride at low temperature to give a dinner of 6-chloro-6-methyl-5-nitrosotetrahydropyran-2-on (II), hydrolyzing said 6-chloro-6-methyl-5-nitrosotetrahydropyran-2-on with water at room temperature and subjecting 4-oximino-5-oxohexanoic acid (III) thus produced to catalytic reduction with hydrogen over platinum to give desired DL-erythro-4-amino-5-hydroxyhexanoic acid (IV).

According to the present invention, the desired product 5-acetamide-6-methyltetrahydropyran-2-ol (VI) may be further utilized to synthesize a new compound 3-acetamide-2-methyl-3,4-dihydro-2H-pyran (VII). That is to say, the compound (VI) is acetylated with acetic anhydride at room temperature in the presence of an organic tertiary base, for example, pyridine and then subjected to thermo-decomposition as it is without separation of acetate thus formed to give 3-acetamide-2-methyl-3,4-dihydro-2H-pyran (VII) from which kasugamycin or its homologue may be easily synthesized by usual known methods.

The process of the invention described above can be illustrated schematically by the following reaction formulas

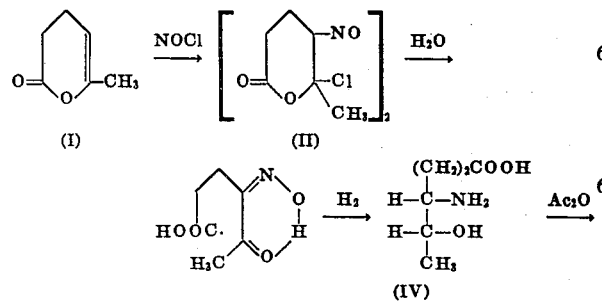

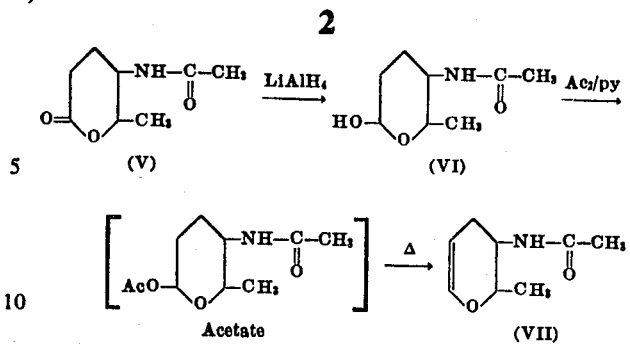

On the other hand, according to the present invention the desired 5-acetamide-6-methyltetrahydropyran-2-ol (VI) may be converted to useful tetrahydropyran derivatives (XI) by treating with acetic anhydride at a temperature over 100°C. in the presence of an organic tertiary base, for example, pyridine, reacting 3-diacetylamino-2-methyl-3,4-dihydro-2H-pyran (VIII) thus formed with nitrosyl chloride, treating the dimer of 2-chloro-5-diacetylamino-6-methyl-3-nitrosotetrahydropyran (IX) thus formed with lower alcohol such as methanol, ethanol and isopropanol in the presence of an organic solvent at moderate temperature to give acetal of nitroso dimer (X) and reducing said acetal followed, for example, by treatment with strong acidic ion exchange resin to give tetrahydropyran derivatives (XI) which are useful raw material for amino sugars.

This modified process of the invention can be illustrated schematically by the following reaction formulas

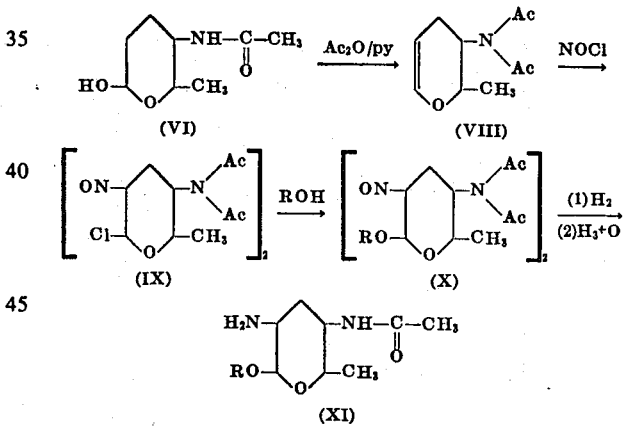

wherein R represents hydrocarbon radical or hydrocarbon radical containing hydroxyl group.

According to the present invention nitrosyl chloride to be reacted with unsaturated lactone, 6-methyl-3,4-dihydropyran-2-on (I) is used in an amount of 1.0 – 1.5 mol equivalent, preferably 1.0 – 1.2 mol equivalent. For a desirable organic solvent there may be mentioned a halogenated solvent such as methylene chloride, chloroform, carbon tetrachloride but any solvents which are inert to nitrosyl chloride and dissolve unsaturated lactone (I) under reaction conditions may be used. In this reaction, temperature and reaction atmosphere are particularly important. The desirable temperature is −80° – 50°C. preferably −60°– −20°C. and the reaction is desirable to be carried out in the atmosphere of nitrogen or argon gas. The reason why these conditions are particularly important is resulted from the fact that the product is liable to decompose and change to a tar-like material the structure of which is extremely difficult to confirm by merely leaving along at near room temperature for 2 – 3 hours in the presence of air. After completion of the reaction the crystalline precipitates formed are at once collected by filtration and dried at a cold place to give colorless crystal of dimer of 6-chloro-6-methyl-5-nitrosotetrahydropyran-2-on (II) in about theoretical yield.

Said dimer (II) is treated with an aqueous organic solvent to give at one stage 4-oximino-5-oxohexanoic acid (III). Such solvent is tetrahydrofuran, dioxane etc. which can dissolves α -chloronitroso dimer (II), has no active hydrogen and can easily forms a homogenous solution even when water is added. For hydrolysis, equimol of water is theoretically required for α-chloronitroso dimer (II) but usually water would be used in an amount over 10 times from necessity of the hydrolysis being performed in economical period of time. The reaction temperature is 5°– 50°C, preferably near room temperature. After reaction hydrochloric acid formed is neutralized with equivalent amount of inorganic base and the reaction product is concentrated and extracted with an organic solvent. For said organic solvent, acetone, dioxane, ethyl acetate etc. can be used which can easily dissolves the product (III) but not dissolve inorganic salt by-produced. Particularly ethyl acetate is the most preferable solvent. The organic solvent is distilled off to give at one stage 4-oximino-5-oxohexanoic acid (III) in high yield. By reduction of this product (III) the desired DL-erythro-4-amino-5-hydroxhexanoic acid (IV) which is useful as a starting substance for amino sugar may be obtained.

According to the present invention, said DL-erythro-4-amino-5-hydroxyhexanoic acid (IV) obtained by above described method or any other method is lactonized by treatment with acetic anhydride to give an N-acetylated lactone, 5-acetamide-6-methyl-tetrahydropyran-2-on (V). In this reaction acetic anhydride would be used in an amount of –3 — 10 times (by weight) of the erythro acid (IV) but 3 – 5 times amount is advisable. The reaction temperature is especially important. 5° – 60°C, preferably 10° – 20°C. is desirable. The reaction time would be extended over 10 hours after complete dissolution of the erythro acid (IV) in acetic anhydride. The treatment after the reaction is very important. The temperature of water bath should not exceed 60°C. during the concentration under a reduced pressure. When residual liquid is subjected to distillation under a reduced pressure 5-acetamide-6-methyltetrahydropyran-2-on (V) may be obtained in almost quantitative amount. This process is characterized by the fact that by mere reaction of the erythro acid (IV) with acetic anhydride at room temperature, protection of amino group and ring-closing are performed at one stage to give 5-acetamide-6-methyltetrahydropyran-2-on (V) in excellent yield.

5-acetamide-6-methyltetrahydropyran-2-on (V) is dissolved in an organic solvent which is inert to lithium aluminum hydride, and reduced with lithium aluminum hydride to give 5-acetamide-6-methyltetrahydropyran-2-ol (VI). For the organic solvent, ether, tetrahydrofuran and dioxane may be mentioned. Tetrahydrofuran is the most useful solvent. Lithium aluminum hydride may be used in the form of 2 – 6 percent solution in the same solvent as the reaction solvent. The amount of lithium aluminum hydride to be used is 0.5 – 0.7, preferably 0.5 – 0.6 molequivalent to the lactone (V). The reaction temperature should be controlled below 0°C, preferably –10° – –20°C. After completion of the reaction, ice water is added to decompose an excess amount of lithium aluminum hydride and the reaction product is then separated and purified to give 5-acetamide-6-methyltetrahydropyran-2-ol (VI). This process is characterized by the fact that by control of the amount of lithium aluminum hydride and the reaction temperature, the lactone having secondary amide can be partially reduced without following reduction of amide group to hemiacetal in a high yield.

According to the present invention, the hemiacetal 5-acetamide-6-methyltetrahydropyran-2-ol (VI) may be further utilized to synthesize 3-acetamide-2-methyl-3,4-dihydro-α-pyran (VII) through acetate and tetrahydropyran derivatives as described above.

In the former, said hemiacetal (VI) is acetylated with acetic anhydride in the presence of an organic tertiary base, for example, pyridine to give acetate. The amount of each acetic anhydride and pyridine is 3 – 10 times (by weight), preferably 5 – 6 times to the hemiacetal (VI) and the reaction temperature is preferably 5° – 50°

In the latter, the hemiacetal (VI) is first acetylated with acetic anhydride in the presence of an organic solvent to give 3-diacetylamino-2-methyl-3,4 -dihydro-α-pyran (VIII). For the organic solvent used in this process, tertiary base, in particular pyridine is the most desirable one. The suitable reaction temperature is 120° – 150°C. and the reaction time is preferably 12 – 15 hours. For the organic solvent used in case 3-diacetylamino-2-methyl-3,4-dihydro-α-pyran (VIII) is reacted with nitrosyl chloride to give 2-chloro-5-diacetylamino-6-methyl-3-nitrosotetrahydropyran (IX), a halogenated solvent such as methylene chloride, chloroform, carbon tetrachloride etc. is suitable. In particular methylene chloride is the most useful one. This process is characterized by the fact that nitrosyl chloride can be successfully reacted to double bond only by converting acetamide group to diacetylamino group having no active hydrogen.

For the organic solvent used in case 2-chloro-5-diacetylamino-6-methyl-3-nitrosotetrahydropyran (IX) is treated with lower alcohol to give acetal of nitroso dimer (X), any solvent which has no active hydrogen and can dissolve the compound (IX) may be utilized but methylene chloride is the most desirable one. For the neutralizing agent for hydrochloric acid by-produced in this case, silver carbonate, mercuric cyanide and the like may be employed. For the reduction solvent used in case said dimer (X) is reduced to give tetrahydropyran derivatives (XI), water, alcohol, acetic acid and the like may be used but acetic acid is the most useful one. For the reducing catalysts used in the reduction of said dimer (X), platinum, palladium, Raney nickel and the like may be utilized but Adams platinum oxide is the most desirable one. Further for the hydrolysis of diacetylamino group to acetamide group, any strong acidic ion exchange resin may be used. This process is characterized by the facts that acetal of nitroso dimer (X) is obtained by the displacement of α-chloroether and that the hydrolysis and isolation of the desired compound can be carried out at the same time by strong acidic ion exchange.

The present invention is explained more in detail by way of examples in order with respect to each processes.

EXAMPLE 1

10 grams of 6-methyl-3,4-dihydro-2H-pyran-2-one (I) dissolved in 50 ml. of methylene chloride was treated with 6.7 g. of nitrosyl chloride under nitrogen atmosphere with stirring at −60° − −50°C. It took about 3 hours to complete the reaction. Crystalline precipitates (II) were separated from the solution by filtration and washed with 50 ml. of cold ether, showing m.p. 74°C. (15.36 g., 97 percent yield).

Analysis. $C_{12}H_{16}N_2O_6Cl_2$, calc'd: C, 40.58; H, 4.54; N, 7.89; O, 27.03. Found: C, 40.36; H, 4.61; N, 7.73; O, 26.75.

EXAMPLE 2

1 gram of dimer of 6-chloro-6-methyl-5-nitrosotetrahydropyran-2-one (II) was suspended in a mixed solution of 20 ml. of dioxane and 5 ml. of water and the suspended solution was stirred at 20° − 30°C. for 1 hour to afford a transparent acidic solution. The solution was neutralized with 1N sodium hydroxide solution (5.63 ml.) and the solvent was evaporated. The residue was treated with 30 ml. of ethyl acetate to remove insoluble materials. After removal of the solvent, 0.9 g. of crude 4-oximino-5-oxohexanoic acid (III). It was recrystallized from chloroform to afford colorless needle crystals, showing m.p. 94° − 95.5°C. The yield was 84 percent.

Analysis. $C_6H_9NO_4$, Calc'd: C, 45.28; H, 5.70; N, 8.80; O, 40.22. Found: C, 45.19; H, 5.67; N, 8.84; O, 40.14.

EXAMPLE 3

12 grams of 4-oximino-5-oxohexanoic acid (III) dissolved in 150 ml. of water was catalytically reduced with 0.3 g. of platinum oxide over 10 hours at room temperature. After the reaction, the catalyst was removed by filtration and the filtrate was condensed to about 10 ml. By adding 150 ml. of ethanol, crude crystalline materials DL-erythro-4-amino-5-hydroxyhexanoic acid (IV) were obtained, showing m.p. 184° − 185°C. after recrystallization from a mixed solvent of water and ethanol. The crystals (7.88 g., 71 percent) yield) were obtained.

Analysis. $C_6H_{13}NO_3$, Calc'd: C, 48.96; H, 8.90; N, 9.52; O, 32.62. Found: C, 48.94; H, 8.85; N, 9.74; O, 32.86.

EXAMPLE 4

5 grams of DL-erythro-4-amino-5-hydroxyhexanoic acid (VI) was treated with 25 ml. of acetic anhydride at room temperature for 12 hours, affording a transparent solution. Excess of acetic anhydride and acetic acid was removed at 35° − 40°C. under a reduced pressure as completely as possible, and then the residue was distilled under a reduced pressure, affording 6.5 g. (95 percent yield) of N-acetylated lactone (V), b.p. 165° − 168°/0.22 mmHg.

Analysis. $C_8H_{13}NO_3$, calc'd: C, 56.12; H, 7.65; N, 8.18; O, 28.04. Found: C, 56.34; H, 7.84; N, 8.21; O, 28.05.

EXAMPLE 5

9 grams of N-acetylated lactone (V) was dissolved in 100 ml. of anhydrous tetrahydrofuran and treated with lithium aluminum hydride gradually (23 ml. of 4.57 percent tetrahydrofuran) under keeping th reaction temperature at −20° − −10°C. The reaction mixture was allowed to stand at −20°C. for 1 hour with stirring, and then treated with 50 ml. of tetrahydrofuran and 4 ml. of ice water. After removing insoluble materials, the solvent was removed under a reduced pressure to afford crude crystalline precipitates, which were recrystallized from a mixed solvent of acetone and ether to afford 6.37 g. (70 percent yield) of colorless needle crystals (VI), m.p. 139° − 141°C.

Analysis. $C_8H_{15}NO_3$, calc'd: C, 55.47; H, 8.73; N, 8.09; O, 27.71. Found: C, 55.43; H, 8.68; N, 7.83; O, 27.72.

EXAMPLE 6

DL-erythro-4-amino-5-hydroxyhexanoic acid (IV, 4.3 g.) was dissolved in 100 ml. of water and 5.1 ml. of 37 percent formalin solution and 3 g. of 5 percent palladium-charcoal were added to the solution. After 1 hour reaction at room temperature, the catalyst was removed by filtration and a solid material was obtained after removing the solvent. It was recrystallized from a mixed solvent of methanol and ether to afford 5.0 g. (97.7 percent yield) of colorless plate crystals, DL-erythro-4-dimethylamino-5-hydroxyhexanoic acid, m.p. 158° − 159°C. (97.7 percent).

Analysis. $C_8H_{17}NO_3$, calc'd: C, 54.83; H, 9.78; N, 7.99; O, 27.39. Found: C, 54.93; H, 9.83; N, 8.26; O, 27.89.

2 grams of the dimethylamino acid was treated with acetic anhydride (20 ml.) at room temperature for 12 hours. Excess of acetic anhydride was removed under a reduced pressure, and then 1.7 g. (94.7 percent yield) of a colorless oily material (VIII) was obtained, b.p. 114° − 115°/5 mmHg. The picrate showed m.p. 153° − 154°C.

Analysis. $C_{14}H_{18}N_4O_9$(picrate), calc'd: C, 43.52; H, 4.70; N, 14.50; O, 37.27. Found: C, 43.52; H, 4.76; N, 14.16; O, 37.29.

To a solution of the lactone VIII (1.57 g.) dissolved in 10 ml. of anhydrous tetrahydrofuran, 4.3 percent tetrahydrofuran solution of lithium aluminum hydride (4.4 ml.) was added over 10 minutes under keeping the temperature below −10°C. and the reaction mixture was stirred for 1.5 hours at −10° − −20°C. After decomposing excess of lithium aluminum hydride with water, insoluble materials were removed by filtration. The filtrate was distilled under a reduced pressure, affording 1.1 g. (90 percent yield) of DL-forosamine, that is, 3-dimethylamino-2-methyl-3,4-dihydropyran-2-ol, b.p. 92° − 94°C/2 mmHg. The picrate showed m.p. 155.5° − 157°C.

Analysis. $C_{14}H_{20}N_4O_9$, calc'd: C, 43.30, H, 5.19; N, 14.43; O, 37.08. Found: C, 43.38; H, 5.46; N, 14.20; O, 36.98.

EXAMPLE 7

1 gram of a hemiacetal (VI) was treated with 5 ml. of acetic anhydride and 5 ml. of pyridine at room temperature for 3 hours. After removing excess acetic anhydride under a reduced pressure, the residue was distilled under a reduced pressure to afford a pale-yellow oil, b.p. 125° – 128°C/3 mmHg. It was triturated with n-hexane to afford 0.85 g. (95 percent yield) of crystalline materials (VII), m.p. 58° – 59°C.

Analysis. $C_8H_{13}NO_2$, calc'd: C, 61.12; H, 9.62; N, 8.91; O, 20.35. Found: C, 61.33; H, 9.77; N, 8.95; O, 20.40.

EXAMPLE 8

10 grams of a hemiacetal (VI) was treated with 50 ml. of acetic anhydride and 50 ml. of pyridine under reflux for 8 hours. After the reaction, excess of acetic anhydride and pyridine were first removed under a reduced pressure and the residue was distilled under a reduced pressure, affording an N-diacetyldihydropyran (VIII), 7.97 g. (70 percent yield), b.p. 110° – 111°C/3.5 mmHg.

Analysis. $C_{10}H_{15}NO_3$, calc'd: C, 60.89; H, 7.67; N, 7.10; O, 24.34. Found: C, 61.08; H, 7.84; N, 7.18; O, 24.05.

EXAMPLE 9

To a solution of the diacetyldihydropyran (VIII) (3 g.) in 10 ml. of methylene chloride, nitrosyl chloride was introduced at −70°C. until the color became brown. After the reaction, 300 ml. of well-cooled ether (at −70°C.) was added to the reaction mixture to give an emulsion. Excess of nitrosyl chloride was removed by an evaporator and white precipitates were deposited on the wall, which was washed with anhydrous ether. The white powder (IX) (3.33 g., 83 percent yield) showed m.p. 75° – 76°C. (dec.).

Analysis. $(C_{10}H_{15}N_2O_4Cl)_2$, calc'd: C, 45.72, H, 5.76; N, 10.67. Found: C, 45.63; H, 5.80; N, 10.66.

EXAMPLE 10

To a suspension of 0.4 g. of the chloronitroso dimer (IX) and 0.4 g. of mercuric cyanide in 20 ml. of methylene chloride, 10 ml. of methanol was added and the mixture was stirred at room temperature for 3 hours to give a transparent solution. After complete removal of the solvent, a crystalline material was obtained. It was recrystallized from a mixed solvent of methanol and methylene chloride, to yield colorless crystals (0.32 g., 76.5 percent yield) of methyl glycoside (X, R = $CH_3$), m.p. 135° – 136°C. (0.32 g.).

Analysis. $(C_{11}H_{18}N_2O_5)_2$, calc'd: C, 51.15; H, 7.03; N, 10.85; O, 30.98; M.W., 516.5. Found: C, 51.25; H, 7.05; N, 10.73; O, 30.51; M.W., 530.5 (by vapor pressure osmometer).

EXAMPLE 11

By the use of ethanol instead of methanol in Example 10, ethyl glycoside (X, R = $C_2H_5$) was obtained in an excellent yield, m.p. 139° – 140°C.

Analysis. $(C_{12}H_{20}N_2O_5)_2$, calc'd: C, 60.89; H, 7.67; N, 7.10; O, 24.34. Found: C, 61.08; H, 7.84; N, 7.18; O, 24.05.

EXAMPLE 12

By the use of isopropanol instead of methanol in example 10, isopropyl glycoside (X, R = i-propyl) was obtained in excellent yields, m.p. 129° – 130°C.

Analysis. $(C_{13}H_{22}N_2O_5)_2$, calc'd: C, 54.53; H, 7.75; N, 9.45; O, 27.94. Found: C, 54.57; H, 7.63; N, 9.45; O, 27.99

EXAMPLE 13

The methyl glycoside nitros o dimer (X, R = $CH_3$) (1 g.) dissolved in acetic acid was reduced with platinum oxide according to usual catalytic method. After the reaction, 800 ml. of water was added and the mixture was passed through a column of Dowex 50W $X_4$ (100 – 200 mesh, 1.5 × 25 cm.). The column was once washed with 200 ml. of water and then eluted with 0.2N $NH_4OH$.

The fractions positive to ninhydrin test were combined and 0.8 g. of a solid material was obtained after removal of the solvent. It was dissolved in 20 ml. of water and treated with equivalent amount of hydrogen chloride. After removal of the solvent, crystalline monohydrochloride of N-acetyl-DL-methyl-kasugaminide (XI, R = $CH_3$), m.p. 203° – 204°C. was obtained in 96 percent yield.

Analysis. $C_9H_{18}N_2O_3 \cdot HCl$ calc'd: C, 45.28; H, 8.02; N, 11.74; O, 20.11. Found: C, 45.55; H, 8.04; N, 11.54; O, 20.09.

The N-acetyl derivative (XI, R $CH_3$) was easily hydrolyzed with barium hydroxide at room temperature for 48 hours to give methyl- α-DL-rasugaminide, that is, methyl 2,4-diamino-2,3,4,6-tetradeoxy-α-arabinohexopyranoside.

EXAMPLE 14

The similar treatment of the chloronitrosodimer (IX) with 1:2:3:4-di-O-isopropylidene-D-inositol as Example 10, followed by hydrogenation over platinum catalyst as example 13 and by refluxing in 50 percent acetic acid solution afforded $N^4$-acetylkasuganobiosamine (XI, R = residue of D-inositol), m.p. 139° – 142°C. The treatment of this compound with barium hydroxide as Example 13 afforded kasuganobiosamine, that is, 2,4-diamino-2,3,4,6-tetradeoxy-α-arabino-hexopyranoside of D-inositol.

We claim:

1. A process of making 5-acetamide-6-methyl-tetrahydropyran-2-one which comprises reacting DL-erythiro-4-amino-5-hydroxyhexanoic acid with 3 – 10 times its own weight of acetic anhydride at a temperature of from about 5° to about 60°C.

2. 5-Acetamide-6-methyltetrahydropyran-2-one.

* * * * *